Feb. 15, 1949.  P. BARKER  2,461,805
AIRPLANE WING ARRANGEMENT
Filed Oct. 6, 1944  2 Sheets-Sheet 1

Parrish Barker
INVENTOR.

ATTORNEY

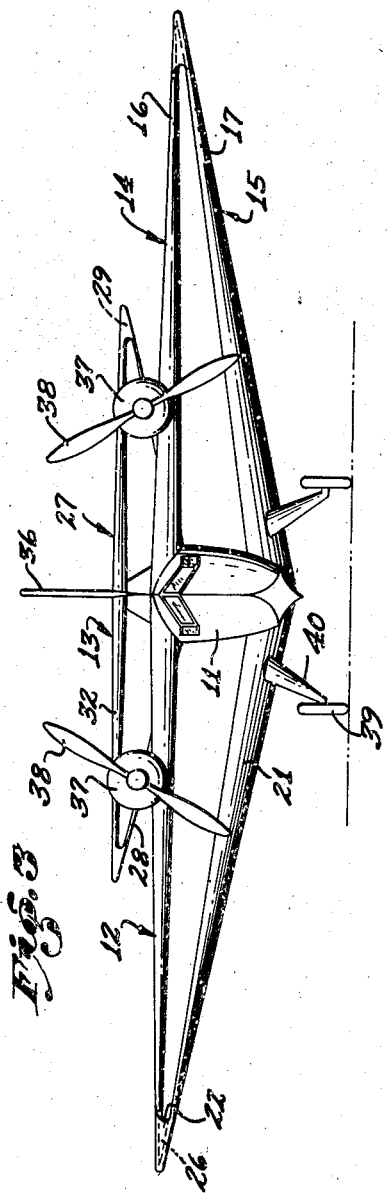
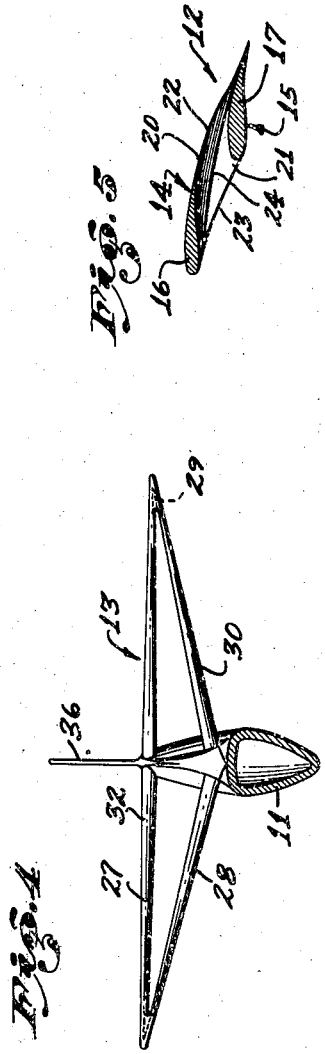

Patented Feb. 15, 1949

2,461,805

UNITED STATES PATENT OFFICE 2,461,805

AIRPLANE WING ARRANGEMENT

Parrish Barker, Temple City, Calif.

Application October 6, 1944, Serial No. 557,415

7 Claims. (Cl. 244—45)

My invention relates to airplane construction of the type in which a dual wing construction is used both at the nose and tail of the airplane, being an improvement on the airplane shown in my Patent No. 2,276,642.

The principal object of my invention is to provide an airplane in which the balance is so controlled that the airplane may travel and land at a reduced speed without losing its equilibrium, whereby the airplane may take off and land from small landing fields or upon highways, thereby providing an airplane which is safer and more desirable for universal usage.

Another object of my invention is to provide an airplane of simple form and construction in which the advantages of the high wing type are combined with the advantages of the low wing type in a single airplane, such airplane having a substantially horizontally disposed wing structure and a dihedral type low wing structure, the wing sections on each side of the fuselage at the nose and tail each forming a truss through the juncture of the wing tips making for greater strength and rigidity and lessening the danger of wing buckling or breaking off due to too great a stress on one wing as is often the case with monoplanes.

The airplane of my invention has two forward or lifting wing sections on each side forming dual wings and two tail wing sections on each side of the fuselage forming dual wings. The lifting wings each comprise a substantially horizontally disposed upper airfoil section which is arranged forward of the lower dihedral airfoil section, whereas the tail wings are arranged with the lower dihedral airfoil section disposed ahead of the upper horizontal airfoil section.

Other objects and advantages will appear hereinafter from the following description and drawings.

Referring to the drawings, which are for illustrative purposes only:

Fig. 3 is a front elevational view of the airplane shown in the preceding figures;

Fig. 4 is a sectional view on line 4—4, Fig. 2, looking in the direction of the arrows; and Fig. 5 is a sectional view on line 5—5, Fig. 2, looking in the direction of the arrows or toward the tip of the wings.

Figures 1, 2:
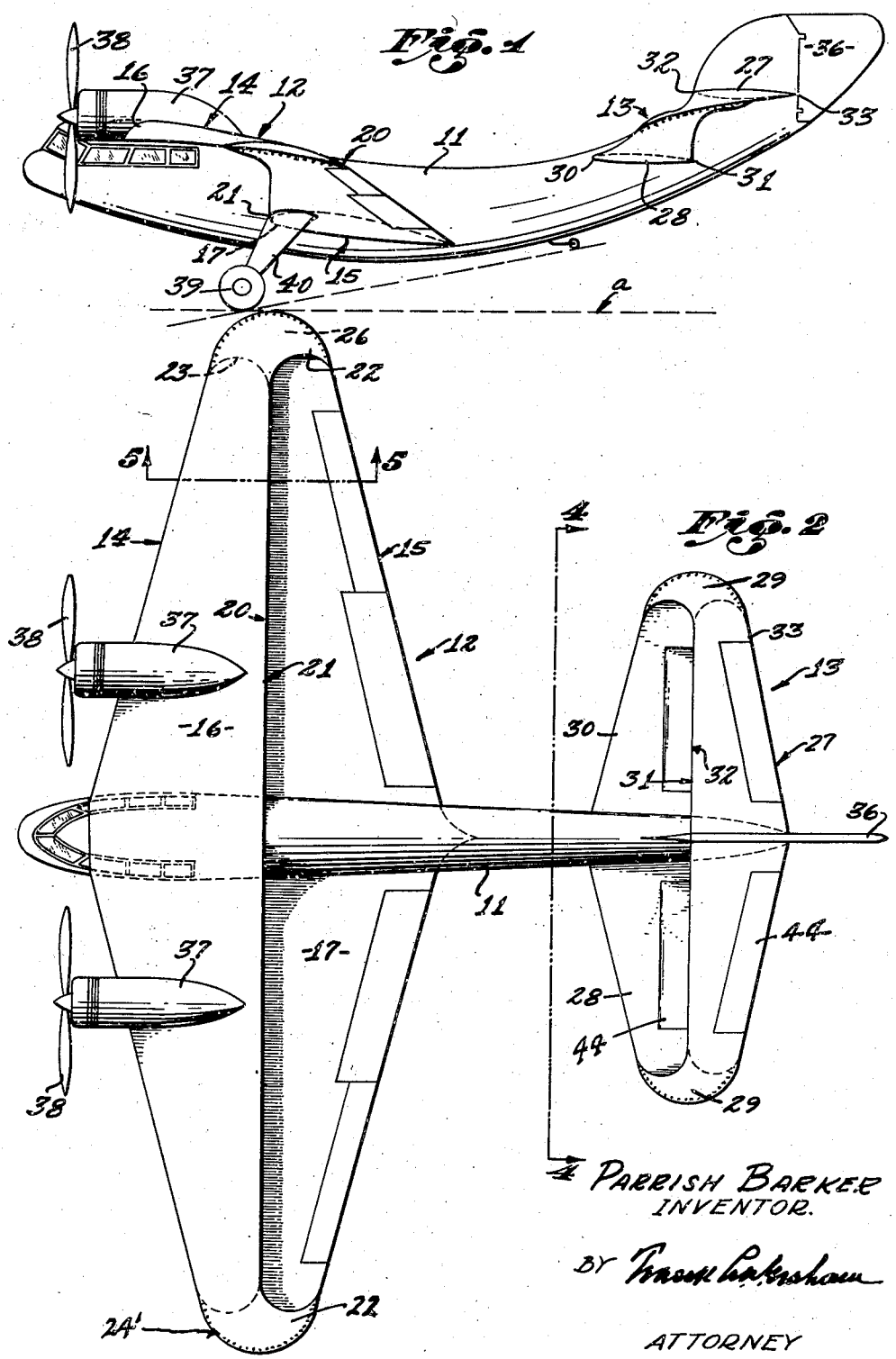
Fig. 1 is a side elevational view of an airplane embodying a form of my invention, the airplane being shown in flight position.
Fig. 2 is a plan view of the airplane shown in Fig. 1.

Referring more particularly to the drawings, 11 indicates the body or fuselage of an airplane, which, when in flight, assumes the position shown in Fig. 1. In this figure the broken line $a$ indicates the horizontal surface of the ground.

The airplane is provided with lifting wings generally indicated at 12 and tail wings generally indicated at 13.

The lifting wings comprise an upper wing generally indicated at 14 and a lower wing generally indicated at 15. The upper wing 14 is substantially horizontal whereas the lower wing 15 is what is commonly termed a dihedral wing. The airplane has two forward or lifting airfoil sections, the upper section indicated at 16 and the lower section indicated at 17, on each side of the fuselage joined at their rounded tips to form what may be termed an elliptical dual wing structure on each side of the fuselage. As clearly shown in Fig. 2, the upper wing 14 is forward of the lower wing 15, the trailing edge 20 of the upper wing 14 being substantially over the leading edge 21 of the lower wing 15, the trailing edge 20 of the upper wing forming a substantially straight line as does the leading edge 21 of the lower wing. The leading edge of the upper wing 14 and the trailing edge of the lower wing 15 are angularly disposed. The sweep back angle of the forward lifting wing being approximately the same angle as the dihedral of the rear lifting wing, the lower lifting wing however being a little longer and of greater angle of incidence in order to give the two wings approximately the same lifting capacity. The wings diminish in width from the fuselage to the wing tips as also does the gap between the two wings. The two wings are joined at the rounded edge of their tips, the upper wing curving downwardly and rearwardly into the lower wing tip as indicated at 22 in Fig. 2 and the tip of the lower wing curving upwardly into and under the tip of the upper wing as indicated in dotted lines at 23 in Fig. 2. This manner of joining the wing tips of the lifting wings results in a downwardly and rearwardly extending angular surface at the portion indicated by the numeral 22 and an upwardly and forwardly extending angularly disposed surface as shown at 23 in the Fig. 5, the space between these two surfaces forming a pocket indicated at 26. This structure is better illustrated in Fig. 5, which shows the juncture of the wing tips as indicated at 24, it being understood that the wing tips of the upper and lower airfoils are joined together in any suitable manner, as for instance by rivets as indicated at $24^1$.

The structure just described forms a stable construction in the nature of a truss, thereby doing away with the exterior bracing of the wings by means of struts or wires as is ordinarily done when there is more than one wing, the dual wing section on each side of the fuselage having an upper airfoil section and a lower airfoil section as heretofore mentioned.

The tail wing structure is substantially the same in that it includes an upper horizontally disposed wing indicated at 27 and a lower dihedral wing indicated at 28 with the difference that the lower wing 28 is forward of the upper wing 27, the tips of the upper and lower wings being joined in the same manner as heretofore described with respect to the lifting wings. However, in view of the fact that the upper wing 27 is behind the lower wing 28, the tip of the upper wing at the point indicated by the numeral 29 extends downwardly and forwardly, forming an angular wind surface at the tip of the wing, the tip of the lower wing 28 curving angularly upward to its juncture with the tip of the upper wing forming a pocket similar to the pocket 26 formed by the joining of the tips of the lifting wings.

While I have said that the tail wing structure is substantially the same as the lifting wing structure it is to be noted that the lower wing 28 of the tail wing structure is provided with an angularly disposed leading edge 30 like that of the upper wing 14 of the lifting wings. The trailing edge 31 of the wing 28 is substantially in line with and below the leading edge 32 of the wing 27 and the trailing edge 33 of the wing 27 is angular in reverse form to the leading edge 30 of the wing 28.

In the form of airplane shown, 36 designates the rudder, 37 the engine nacelle mounted on the upper lifting wings 14, there being one motor nacelle on each side of the fuselage and each furnishing power for propellers indicated at 38. 39 indicates the landing wheels which are supported by means of struts 40 fixed at their upper ends to the lower wing in any suitable manner as is ordinarily done.

The structure of the wing tips above described, which includes the gap or separation between the lower surface of the upper wing and the upper surface of the lower wing, creates at the wing tips of the lifting wings an area of high pressure in front of the wings, an area of increased vacuum behind, with what may be termed a vacuum pocket between the two surfaces, thereby giving an added lifting and steadying effect to the airplane in flight and contributing materially to the lateral stability of the plane. It is pointed out that as the chord of the airfoils decreases toward the tip the gap between the upper and lower airfoils decreases.

While this high pressure area at the wing tips of the lifting wings would tend to add to the lift of the wings and also tend to increase the angle of incidence of the wings, opposing forces would act upon the wing tips of the tail wings caused by the downward sweep of the rear upper wing into the front lower wing, thereby creating an area of negative pressure which performs the function of holding the whole tail assembly down when in flight, making it possible to maintain flight at lower speed and land at lower speed. This area of negative pressure would increase perceptibly as the nose of the plane is depressed, and as this condition of forcing the tail down takes place, then the nose of the plane would be forced back upwardly to the normal flying position where the normal functioning of the two rear wings come into action and the plane again assumes a position of level flight. This action as described would tend to correct any diving propensity of the plane by the tail being held down, the more the nose goes down the more or faster the tail wings go down. This high pressure area at tail wing tips would be affected by the back-wash from the propellers, thereby holding the tail wings down and enabling the plane to land at lower speed. Also, should the opposite effect occur, that of nosing up too sharply, then the double elevators on the tail wings shown at 44 could be used to raise the tail, thus counteracting the tendency to nose up, or by lessening the speed of the motors. Furthermore, the high-pressure area at the front portion of the lifting wing-tips, as shown at 23 of Fig. 2, being directly under the forward wing, any stalling propensity of the plane would naturally start at this area, thus creating an effect equivalent to positive décalage, as relating to the two lifting wings, and since the rear wing is behind the center of gravity of the plane, it would, in conjunction with the stabilizer wings, off-set or neutralize the stalling attitude and bring the plane back into balance.

Although one form of the invention has been particularly shown and described, it is contemplated that various changes and modifications can be made without departing from the scope of the invention and it is intended to cover such changes and modifications as come within the scope of the claims.

I claim as my invention:

1. In airfoil means adapted to be mounted on and extend laterally of the fuselage of an airplane: a continuous dual wing at each side of the fuselage, each wing comprising an upper airfoil section having a rearwardly and outwardly extending leading edge and a straight trailing edge; a lower airfoil section having its leading edge substantially under the trailing edge of the upper airfoil section and its trailing edge extending outwardly and forwardly from the fuselage; said upper airfoil section having a tip portion extending downwardly and rearwardly to the tip portion of the lower airfoil section and said lower airfoil section having a tip portion extending upwardly and forwardly to the tip portion of the upper airfoil section, said tip portions being joined at their edges forming an air pocket therebetween.

2. In airfoil means adapted to be mounted on and extend laterally of the fuselage of an airplane: a continuous dual wing at each side of the fuselage, each wing comprising an upper airfoil section having a rearwardly and outwardly extending leading edge and a straight trailing edge; a lower airfoil section having its leading edge substantially under and in line with the trailing edge of the upper airfoil section and its trailing edge extending outwardly and forwardly from the fuselage; said upper airfoil section having a tip portion extending downwardly and rearwardly to the tip portion of the lower airfoil section and said lower airfoil section having a tip portion extending upwardly and forwardly to the tip portion of the upper airfoil section, said tip portions being joined at their outer edges forming an air pocket therebetween.

3. In airfoil means adapted to be mounted on and extend laterally of the fuselage of an airplane: a continuous dual wing at each side of the fuselage, each wing comprising an upper airfoil section having a rearwardly and outwardly extending leading edge and a straight trailing edge; a lower airfoil section having its leading edge substantially under the trailing edge of the upper airfoil section and its trailing edge extending outwardly and forwardly from the fuselage; said upper airfoil section having a tip portion extending downwardly and rearwardly to the tip portion of the lower airfoil section and said lower airfoil section having a tip portion extending upwardly and forwardly to the tip portion of the upper airfoil section, said tip portions being joined at their edges forming an air pocket therein, said upper airfoil section being substantially horizontal and said lower airfoil section extending angularly upwardly and outwardly from the fuselage.

4. In airfoil means adapted to be mounted on and extend laterally of the fuselage of an airplane: a continuous dual lifting wing at each side of the fuselage, each wing comprising an upper airfoil section having a rearwardly and outwardly extending leading edge and a straight trailing edge; a lower airfoil section having its leading edge substantially under and in line with the trailing edge of the upper airfoil section and its trailing edge extending outwardly and forwardly from the fuselage; said upper airfoil section having a tip portion extending downwardly and rearwardly to the tip portion of the lower airfoil section and said lower airfoil section having a tip portion extending upwardly and forwardly to the tip portion of the upper airfoil section, said tip portions being joined at their meeting edges forming an air pocket therein, said upper airfoil section being substantially horizontal and said lower airfoil section extending angularly upwardly and outwardly from the fuselage; a continuous dual tail wing at each side of the fuselage, each tail wing comprising an upper horizontally disposed airfoil section having a substantially straight leading edge and a forwardly and outwardly extending trailing edge; a lower tail airfoil section having its trailing edge substantially under the leading edge of the upper airfoil section and its leading edge extending outwardly and rearwardly from the fuselage; said upper airfoil tail section having a tip portion extending downwardly and forwardly to the leading edge of the lower tail airfoil section; and said lower airfoil tail section extendng upwardly and rearwardly to the traling edge of the upper airfoil tail section; said tip portions of the tail airfoil sections being joined together forming a pocket therebetween; said upper airfoil section being substantially horizontal and said lower airfoil section extending angularly upwardly and outwardly from the fuselage.

5. An airfoil structure for use in combination with a fuselage comprising a continuous dual wing at each side of the fuselage, each wing comprising an upper and a lower airfoil section, one of said sections having a rearwardly and outwardly extendinng leading edge and a straight trailing edge and the other of said sections having a substantially straight leading edge and a forwardly and outwardly extending trailing edge, the straight edges of said sections being substantially one above the other, said upper and lower airfoil sections having connecting tip portions and said tip portions being joined at their edges, forming an air pocket therebetween.

6. In an airplane fuselage having main wings projecting laterally therefrom intermediate its ends, a continuous dual tail wing at each side of the rear end of the fuselage, each tail wing comprising an upper airfoil section having a substantially straight leading edge and a forwardly and outwardly extending trailing edge, and a lower airfoil section having its trailing edge substantially under the leading edge of the upper airfoil section and its leading edge extending outwardly and rearwardly from the fuselage, said upper airfoil section having a tip portion extending downwardly and forwardly to the tip portion of the lower airfoil section and said lower airfoil section having a tip portion extending upwardly and rearwardly to the tip portion of the upper airfoil section, said tip portions being joined at their edges forming an air pocket therebetween.

7. In an airplane fuselage having main wings projecting laterally therefrom intermediate its ends, a continuous dual tail wing at each side of the rear end of the fuselage, each tail wing comprising an upper airfoil section having a substantially straight leading edge and a forwardly and outwardly extending trailing edge, and a lower airfoil section having its trailing edge substantially under the leading edge of the upper airfoil section and its leading edge extending outwardly and rearwardly from the fuselage, said upper airfoil section having a tip portion extending downwardly and forwardly to the tip portion of the lower airfoil section and said lower airfoil section having a tip portion extending upwardly and rearwardly to the tip portion of the upper airfoil section, said tip portions being joined at their edges forming an air pocket therebetween, said upper airfoil section being substantially horizontal and said lower airfoil section extending angularly upward outwardly from the fuselage.

PARRISH BARKER.

REFERENCES CITED

The following references are of record in the file of this patent:

UNITED STATES PATENTS

| Number | Name | Date |
| --- | --- | --- |
| 1,613,091 | Francis | Jan. 4, 1927 |
| 1,747,565 | Yonkese | Feb. 18, 1930 |
| 1,895,140 | Stage | Jan. 24, 1933 |
| 1,939,682 | Fleming | Dec. 19, 1933 |
| 2,110,443 | Larsen | Mar. 8, 1938 |
| 2,353,856 | Shannon | July 18, 1944 |

FOREIGN PATENTS

| Number | Country | Date |
| --- | --- | --- |
| 140,080 | Great Britain | June 9, 1921 |
| 11,921 | Great Britain | 1912 |
| 450,676 | Great Britain | July 22, 1936 |
| 42,428 | France | May 2, 1933 |
| | (Addition to 736,876) | |